United States Patent [19]

Hirai et al.

[11] Patent Number: 5,476,605
[45] Date of Patent: Dec. 19, 1995

[54] MN-ZN FERRITE

[75] Inventors: Naoe Hirai, Yokohama; Tohoru Murase; Katsunobu Okutani, both of Ichikawa; Teruo Mori, Sakura, all of Japan

[73] Assignee: TDK Corporation, Tokyo, Japan

[21] Appl. No.: 229,121

[22] Filed: Apr. 18, 1994

Related U.S. Application Data

[63] Continuation of Ser. No. 995,912, Dec. 22, 1992, abandoned, which is a continuation of Ser. No. 707,317, May 30, 1991, abandoned, which is a continuation of Ser. No. 285,452, Dec. 16, 1988, abandoned.

[30] Foreign Application Priority Data

May 23, 1988 [JP] Japan ................................. 63-124022

[51] Int. Cl.$^6$ ..................................... C04B 35/26
[52] U.S. Cl. ........................ 252/62.62; 252/62.58
[58] Field of Search ........................ 252/62.62, 62.58

[56] References Cited

U.S. PATENT DOCUMENTS

| | | | |
|---|---|---|---|
| 1,773,235 | 8/1930 | Mitchell | 75/725 |
| 2,423,385 | 7/1947 | Hixson et al. | 134/10 |
| 3,781,405 | 12/1973 | Allan et al. | 423/142 |
| 3,822,210 | 7/1974 | Iwase et al. | 252/62.62 |
| 3,860,524 | 1/1975 | Goldman | 252/62.62 |
| 3,903,236 | 9/1975 | McCutcheon et al. | 423/35 |
| 4,026,773 | 5/1977 | Van Peteghem | 204/108 |
| 4,372,865 | 2/1983 | Yu et al. | 252/62.62 |

FOREIGN PATENT DOCUMENTS

| | | | |
|---|---|---|---|
| 1175137 | 7/1964 | Germany | 252/62.62 |
| 1671038 | 10/1971 | Germany | 252/62.62 |
| 49-32711 | 2/1974 | Japan | 423/633 |
| 50-77417 | 6/1975 | Japan | 252/62.62 |
| 62-235221 | 10/1987 | Japan . | |
| 63-117915 | 5/1988 | Japan | 423/633 |

OTHER PUBLICATIONS

Shiehijo et al. "J. of Appl. Phys.", vol. 35 (1964), pp. 1646–1647.

Primary Examiner—C. Melissa Bonner
Attorney, Agent, or Firm—Oblon, Spivak, McClelland, Maier & Neustadt

[57] ABSTRACT

A Mn-Zn ferrite containing a maximum of 0.005 wt. % P.

3 Claims, 1 Drawing Sheet

MN-ZN FERRITE

This application is a continuation of application Ser. No. 07/995,912, filed Dec. 22, 1992, now abandoned, which is a continuation of Ser. No. 07/707,317, filed May 30, 1991, now abandoned, which is a continuation of Ser. No. 07/285,452, filed Dec. 16, 1988, now abandoned.

BACKGROUND OF THE INVENTION

1. Field of the Invention

The present invention relates to a Mn-Zn ferrite used for a magnetic core of a transformer, noise filter or similar device.

2. Description of the Related Art

In general, a high-quality soft ferrite is produced by using an iron oxide with an extremely low impurity content. Table 1 shows examples of the impurity content of several high-purity oxides for high-quality soft ferrite.

The rows marked A and B in Table 1 show examples of two high-purity iron oxides produced by a crystal refining method. In the crystal refining method, the crystals of iron sulfate or iron chloride are crystallized from an aqueous solution thereof, and these crystals are oxidized into an iron oxide. In this method, however, the impurities are not reduced sufficiently by one occurrence of crystallization because some of the impurities still are included in the crystals. Thus, the crystals are dissolved in water again, and crystallized from the solution a second time. These treatments are repeated several times, thereby further reducing the impurity content of the crystals. Utilizing this crystal refining method, a high-purity iron oxide containing not more than about 0.005 wt. % of P is obtained, but the production process is too complicated and the production cost is too high. With this crystal refining method, the Mn content of the iron oxide is less than about 0.1 wt. %.

Among the various impurities in a typical iron oxide, there are some which impair the ferrite properties of soft ferrite, and others which do not. However, in the conventional processes described above where all types of impurities are simultaneously removed, the production process is overly complicated and too expensive. Conventionally, it has not been possible to control the removal of specific impurities to produce an iron oxide having a desired purity level of one impurity, and a different purity level for another impurity.

Accordingly, it is an object of the present invention to provide an iron oxide in which the harmful impurities for ferrite properties have been selectively removed.

It is another object of the invention to provide an iron oxide for high quality soft ferrite which can be made by a simple process.

A further object of the invention is to provide high-quality soft ferrite at a reduced cost.

SUMMARY OF THE INVENTION

To achieve the above objects and advantages, and in accordance with the purposes of the invention as embodied and broadly described herein, the Mn-Zn ferrite of the present invention contains a maximum of 0.005 wt. % of P.

BRIEF DESCRIPTION OF THE DRAWINGS

The accompanying drawings, which are incorporated in and constitute a part of the specification, serve to illustrate the principles of the invention. Of the drawings.

TABLE 1

Examples of high-purity iron oxides

Figure 1:
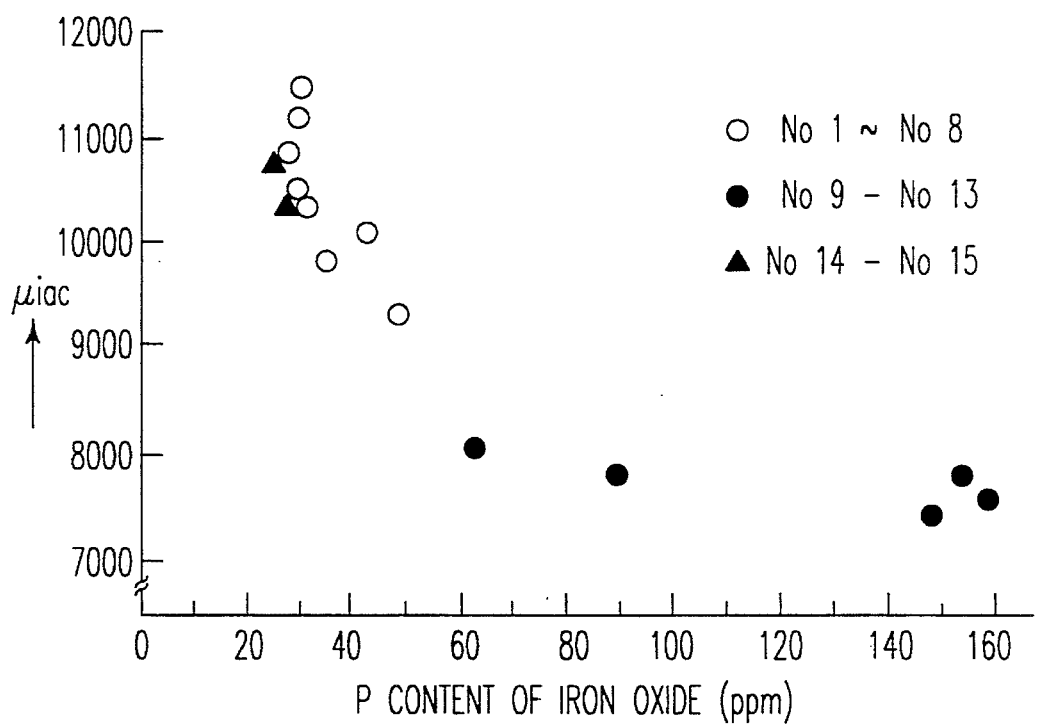
FIG. 1 is a plot showing the relationship between the P content of iron oxide and $\mu iac$ for various soft ferrites.

| | $SiO_2$ | P | Cu | Ni | Cr | Co | V | Al | Mn | Zn | (ppm) Remarks |
|---|---|---|---|---|---|---|---|---|---|---|---|
| A | 40 | 23 | 6 | — | <1 | — | — | 11 | 660 | 340 | Crystal Refining Method |
| B | 85 | 27 | 2 | — | 72 | — | — | 19 | 540 | 13 | Crystal Refining Method |
| C | 31 | 15 | 3 | 32 | <1 | 12 | <1 | <1 | 503 | 3 | Laid-Open Publication No. 235221/1987 |
| D | 51 | 20 | 5 | 40 | 3 | 16 | <1 | <1 | 550 | 5 | Laid-Open Publication No. 235221/1987 |

Examples C and D in Table 1 show iron oxides described in Japanese Patent Application Laid-Open Publication No. 235221/1987, which contain not more than 0.005 wt. % of P. In this method, however, iron is electrolyzed, an anolyte is separated, floc is added thereto, and the resulting solution is filtered. The filtrate then is alkalified and oxidized, and the precipitate thereof is recovered and heated. As is evident from the above description, this process is also complicated and the production cost thereof is very high. In this method, the Mn content of the iron oxide is less than 0.1 wt. %.

DETAILED DESCRIPTION OF THE PREFERRED EMBODIMENT

Reference will now be made in detail to the present preferred embodiment of the invention. In accordance with the invention, the ferrite of the present invention comprises a Mn-Zn ferrite containing a maximum of 0.005 wt. % of P.

The Mn-Zn of the invention was produced according to the following example. A steel sheet scrap (carbon steel) was added to hydrochloric acid with an HCl concentration of 18%. The solution was heated and stirred until the steel scrap dissolved into an iron chloride solution with a pH of about 1.0. Next, 20 liters of nitric acid having a concentration of 60% was added for each cubic meter of the iron chloride solution, and the solution was boiled for one hour.

Subsequently, another steel scrap was added to the boiled solution, and the solution was heated and stirred to obtain a solution with a pH of 3.5. The mechanical stirring was continued further for about 6 hours. Then, insolubles were removed from this solution by filtration using an ordinary filter cloth. The filtrate was roasted and oxidized in a fluidized roasting furnace with the fluidized layer at a temperature of 700° C., thereby producing an iron oxide.

Nos. 1–8 of Table 2 show the impurity contents of iron oxide samples produced according to this process. Nos. 9–13 show the impurity contents of the commercially available iron oxides used for soft ferrites of ordinary grades. No. 14 and No. 15 correspond to examples A and B in Table 1 and show examples of the high-purity iron oxides used for high-quality soft ferrite.

high-purity manganese oxide and a high-purity zinc oxide in the usual manner so that a molecular ratio of $Fe_2O_3:MnO:ZnO$ was 53:24.5:22.5 was obtained. The mixture was then sintered at a temperature of 1350° C. to form test pieces of ring shape, The test pieces had an outer diameter of 25 mm, an inner diameter of 15 mm and a thickness of 5 mm, The AC initial magnetic permeability $\mu iac$ and the relative loss factor $\tan\delta/\mu iac$ at 1 kHz and 25° C. were measured in accordance with the method prescribed in JIS C 2561. In Table 3, the content of the mixed powders and the magnetic properties of the test pieces are shown. The number of each test piece in Table 3 corresponds to the number of one of the oxides in Table 2.

TABLE 3

| No. | Contents of the Mixed Powders | | | | | Magnetic Properties | |
| --- | --- | --- | --- | --- | --- | --- | --- |
| | *$Fe_2O_3$ (%) | *MnO (%) | *ZnO (%) | $SiO_2$ (ppm) | P (ppm) | $\mu iac$ | $\tan\delta/\mu iac$ |
| 1 | 70.28 | 14.48 | 15.24 | 108 | 27 | 10900 | $3.5 \times 10^{-6}$ |
| 2 | 70.39 | 14.40 | 15.21 | 112 | 26 | 11200 | $3.6 \times 10^{-6}$ |
| 3 | 70.37 | 14.44 | 15.19 | 124 | 27 | 10500 | $3.2 \times 10^{-6}$ |
| 4 | 70.31 | 14.47 | 15.22 | 118 | 28 | 11500 | $3.6 \times 10^{-6}$ |
| 5 | 70.34 | 14.39 | 15.27 | 125 | 24 | 10400 | $3.0 \times 10^{-6}$ |
| 6 | 70.34 | 14.41 | 15.25 | 118 | 32 | 9800 | $3.9 \times 10^{-6}$ |
| 7 | 70.40 | 14.42 | 15.18 | 115 | 37 | 10100 | $3.8 \times 10^{-6}$ |
| 8 | 70.33 | 14.44 | 15.23 | 122 | 44 | 9300 | $4.2 \times 10^{-6}$ |
| 9 | 70.38 | 14.42 | 15.20 | 129 | 104 | 7500 | $4.6 \times 10^{-6}$ |
| 10 | 70.43 | 14.40 | 15.17 | 121 | 62 | 7900 | $4.5 \times 10^{-6}$ |
| 11 | 70.35 | 14.46 | 15.19 | 116 | 52 | 8100 | $4.9 \times 10^{-6}$ |
| 12 | 70.33 | 14.45 | 15.22 | 110 | 117 | 7700 | $6.4 \times 10^{-6}$ |
| 13 | 70.42 | 14.38 | 15.20 | 114 | 110 | 7900 | $5.0 \times 10^{-6}$ |
| 14 | 70.35 | 14.42 | 15.23 | 120 | 22 | 10800 | $3.1 \times 10^{-6}$ |
| 15 | 70.38 | 14.45 | 15.17 | 125 | 26 | 10400 | $3.4 \times 10^{-6}$ |

*Weight percentage when $Fe_2O_3$, MnO and ZnO amount to 100%.

TABLE 2

| | Impurity Content | | | |
| --- | --- | --- | --- | --- |
| No. | Mn (%) | P (ppm) | $SiO_2$ (ppm) | Remarks |
| 1 | 0.23 | 27 | 95 | Iron Oxide Used for this Invention |
| 2 | 0.16 | 28 | 50 | |
| 3 | 0.21 | 28 | 55 | |
| 4 | 0.28 | 29 | 75 | |
| 5 | 0.18 | 26 | 80 | |
| 6 | 0.22 | 34 | 72 | |
| 7 | 0.28 | 41 | 83 | |
| 8 | 0.23 | 48 | 68 | |
| 9 | 0.26 | 150 | 105 | Iron Oxide for Ordinary Soft Ferrite |
| 10 | 0.23 | 90 | 85 | |
| 11 | 0.18 | 64 | 95 | |
| 12 | 0.22 | 160 | 80 | |
| 13 | 0.23 | 155 | 60 | |
| 14 | 0.006 | 23 | 40 | High-purity Iron Oxide by Crystal Refining Method |
| 15 | 0.054 | 27 | 85 | |

The reasons for the specific ranges of 0.1–0.3 wt. % Mn and 0.005 wt. % maximum are set forth below.

Figure 2:
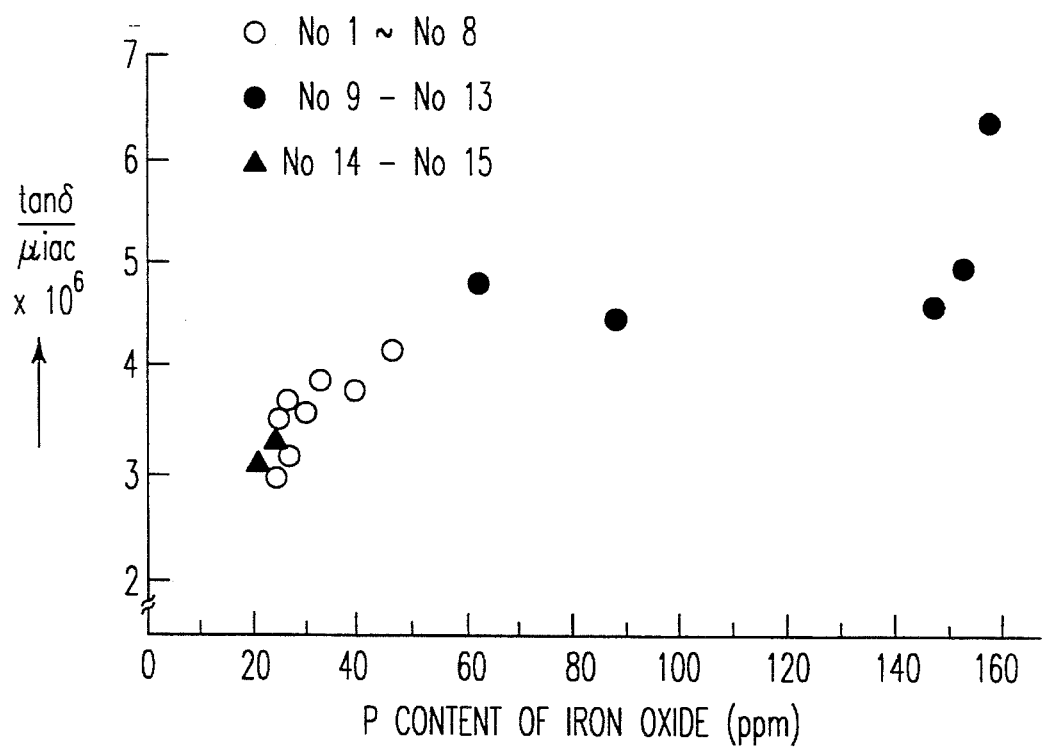
FIG. 2 is a plot showing the relationship between the P content of iron oxide and $\tan\delta/\mu iac$ for the same soft ferrites.

The inventors prepared samples using each of the iron oxides shown in Table 2. Each oxide was mixed with a FIG. 1 represents the relationship between the P content of the iron oxides used for the Mn-Zn ferrite and $\mu iac$ of Table 3. FIG. 2 represents the relation between the P content of the iron oxides used for the Mn-Zn ferrite and $\tan\delta/\mu iac$ of Table 3.

As shown in Table 2 and Table 3, the P contents of the mixed powders are decreased by using iron oxides of low P contents, and as shown in FIG. 1 and FIG. 2, the magnetic properties of a soft ferrite are exceedingly improved by using an iron oxide with a low P content.

Regarding the sort of impurities which impair the ferrite properties, the general concept has not been sufficiently clear. Accordingly, it has been necessary to use very expensive iron oxide of high purity grades to produce high quality soft ferrite.

The present inventors discovered that among the impurities in iron oxides, P has the closest relation to the magnetic properties of soft ferrite, and that by decreasing selectively the P content in iron oxide of ordinary grades, the magnetic properties of the soft 20 ferrite can be significantly improved.

Test pieces Nos. 1–8 made by using the iron oxides with P contents of not more than 0.005 wt. % have a lower P content in the mixed powder, and exhibit very excellent magnetic characteristics compared with test pieces Nos. 9–13 made from iron oxides of ordinary grades. Test pieces Nos. 1–5 of Table 3 are samples made by using iron oxides of the present invention. The P contents of these pieces were controlled to be less than 0.003 wt. %. These samples exhibited the same level of magnetic properties as No. 14 and No. 15.

The iron oxide used for this invention contains 0.1–0.3 wt. % of Mn, and this iron oxide has an advantage in that it can be produced by a simple process and at lower cost.

The iron oxide used for this invention can be provided by the following process. A steel scrap is dissolved in a hydrochloric acid to make an iron chloride solution, the iron chloride solution is dephosphorized by a simple process, the dephosphorized solution is roasted and the iron oxide is thereby produced.

Generally, iron scrap contains about 0.4% Mn. This Mn is dissolved in the iron chloride solution, and the Mn is not decreased by the dephosphorizing and roasting process. Thus, 0.1–0.3 wt. % of Mn is present in the iron oxide used for this invention.

As mentioned above, Mn is mixed with other materials in making a soft ferrite. Therefore, iron oxide containing 0.1–0.3 wt. % Mn does not impair the magnetic properties of a soft ferrite.

The present inventors produced various iron oxides having an Mn content of 0.1–0.3 wt. % and a P content of not more than 0.005 wt. %, and test pieces other than those of Table 3 were produced to investigate the magnetic properties thereof. The investigation showed results of the same level as for Nos. 1–8 of Table 3. Power loss of the ferrite core used for a high frequency power source produced by using the iron oxide powder of this invention was better than those produced by using commercial iron oxides for a soft ferrite of ordinary grades.

Also high-frequency power supply ferrite cores using the iron oxide of the present invention have a power loss value which is regarded as clearly improved over the use of commercially available iron oxide destined for ordinary ferrite. Accordingly, the present invention specifies a Mn-content of 0.1–0.3 wt. % and a P-content of not more than 0.005 wt. %.

As described above, the present inventors also found a new method for removing P selectively from an iron oxide.

The following explanation describes the reasons why an iron oxide whose P content is not more than 0.005 wt. % can be obtained by the method mentioned above. Usually, a steel scrap contains about 0.03 wt. % of P. When it is dissolved in hydrochloric acid, the P is also dissolved into the solution. In order to oxidize the P in the solution to a 5+ oxidation number, nitric acid is added to the solution, and then the solution is boiled. The $P^{5+}$ formed in the solution behaves as in the following formulas (1)–(3):

$$H_3PO_4 = H^+ + H_2PO_4^- \qquad (1)$$

$$H_2PO_4^- = H^+ + HPO_4^{2-} \qquad (2)$$

$$HPO_4^{2-} = H^+ + PO_4^{3-} \qquad (3)$$

When the solution is acidic and has a low pH, the dissociation of formula (2) and (3) does not take place, and $H_3PO_4$ and $H_2PO_4^-$ are formed in the solution. However, P cannot be removed from a solution of low pH because $H_3PO_4$ and the metallic salts of $H_2PO_4^-$ are water soluble. When the pH of this solution is raised to 3.5 by adding another steel scrap thereto, the dissociations of formulas (2) and (3) take place, and $HPO_4^{2-}$ and $PO_4^{3-}$ ions are produced. $HPO_4^{2-}$ and $PO_4^{3-}$ ions may combine with metallic ions in the solution and form metallic salts of $HPO_4^{2-}$ and $PO_4^{3-}$. The metallic salts of $HPO_4^{2-}$ and $PO_4^{3-}$ are insoluble in the solution, and they can be separated as insolubles from the solution by filtration.

Therefore, even though the iron oxide used for the present invention contains Mn as an impurity the Mn-Zn ferrite provided by this iron oxide shows the same excellent magnetic properties as the Mn-Zn ferrite provided by the high purity iron oxides produced by the crystal refining method. However, the iron oxide used for the present invention can be obtained by a remarkably simplified production method and at lower cost as compared with the oxide produced by the crystal refining method.

What is claimed is:

1. A Mn-Zn ferrite having a phosphorus content of 0.0022 to 0.0044 wt. %, which is produced by forming the ferrite from an iron oxide powder containing 0.1 to 0.3 wt. % of manganese and less than 0.005 wt. % of phosphorus.

2. The Mn-Zn ferrite of claim 1, wherein said iron oxide powder used to prepare the ferrite contains from 0.16 to 0.28 wt. % of manganese.

3. The Mn-Zn ferrite of claim 1, wherein said iron oxide powder used to prepared the ferrite contains from 0.0027 to 0.0048 wt. % of phosphorus.

* * * * *